(12) United States Patent
Digne et al.

(10) Patent No.: US 11,434,430 B2
(45) Date of Patent: Sep. 6, 2022

(54) EFFICIENT RECOVERY OF VALUABLE COMPONENTS FROM BIOMASS CATALYTIC PYROLYSIS EFFLUENT

(71) Applicant: Anellotech, Inc., Pearl River, NY (US)

(72) Inventors: Romina Digne, Lyons (FR); Cristina Ruiz Martinez, The Hague (NL); Alexandre Bernard Pagot, St Genis Laval (FR); Marc François Philippe Jacquin, Lyons (FR); Frédéric Jean-Michel Feugnet, Lyons (FR); Charles Mitchel Sorensen, Haverstraw, NY (US)

(73) Assignee: ANELLOTECH, INC., Pearl River, NY (US)

( * ) Notice: Subject to any disclaimer, the term of this patent is extended or adjusted under 35 U.S.C. 154(b) by 16 days.

(21) Appl. No.: 16/631,697

(22) PCT Filed: Jul. 27, 2017

(86) PCT No.: PCT/US2017/044141
§ 371 (c)(1),
(2) Date: Jan. 16, 2020

(87) PCT Pub. No.: WO2019/022743
PCT Pub. Date: Jan. 31, 2019

(65) Prior Publication Data
US 2020/0165527 A1 May 28, 2020

(51) Int. Cl.
*C10G 1/00* (2006.01)
*C10G 5/04* (2006.01)
*B01D 3/14* (2006.01)
*C10G 1/08* (2006.01)
*B01D 5/00* (2006.01)

(52) U.S. Cl.
CPC .............. *C10G 1/002* (2013.01); *C10G 1/08* (2013.01); *C10G 5/04* (2013.01); *B01D 3/14* (2013.01); *B01D 5/0075* (2013.01); *C10G 2300/1011* (2013.01); *C10G 2400/30* (2013.01)

(58) Field of Classification Search
None
See application file for complete search history.

(56) References Cited

U.S. PATENT DOCUMENTS

| 8,277,643 | B2 | 10/2012 | Huber et al. |
| 8,864,984 | B2 | 10/2014 | Huber et al. |
| 2010/0212215 | A1 | 8/2010 | Agblevor |
| 2012/0167452 | A1 | 7/2012 | Platon et al. |
| 2012/0203042 | A1 | 8/2012 | Huber et al. |

(Continued)

OTHER PUBLICATIONS

Yaseen Elkasabi et al, "Distillation and Isolation of Commodity Chemicals from Bio-Oil Made by Tail-Gas Reactive Pyrolysis", ACS Sustainable Chemistry & Engineering,vol. 2, No. 8, Jun. 30, 2014 (Jun. 30, 2014), p. 2042-2052.

(Continued)

*Primary Examiner* — Philip Y Louie
(74) *Attorney, Agent, or Firm* — Roberts Calderon Safran & Cole P.C.

(57) ABSTRACT

A process comprising separating from a biomass catalytic pyrolysis process effluent, a naphthalene-rich oil phase, a phenolic oil and a vapor phase containing off gas, water and BTX, whereby said vapor phase can be condensed to separate liquid water and liquid hydrocarbons from gaseous off gas and BTX.

17 Claims, 3 Drawing Sheets

(56) References Cited

U.S. PATENT DOCUMENTS

| | | |
|---|---|---|
| 2013/0060070 A1 | 3/2013 | Huber et al. |
| 2014/0027265 A1 | 1/2014 | Mazanec et al. |
| 2014/0303414 A1 | 10/2014 | Mazanec et al. |
| 2016/0002162 A1 | 1/2016 | Tanzio |
| 2016/0326438 A1 | 1/2016 | Sorensen |

OTHER PUBLICATIONS

Shurong Wang, "High-Efficiency Separation of Bio-Oil", "Biomass Now—Sustainable Growth and Use", Apr. 30, 2013 (Apr. 30, 2013), InTech.

Kim Joo-Sik, "Production, separation and applications of phenolic-rich bio-oil-A re", Bioresource Technology, Elsevier, Amsterdam, NL, vol. 178, Sep. 8, 2014 (Sep. 8, 2014), p. 90-98.

International Search Report and Written Opinion issued in the corresponding Application No. PCT/US2017/044141 dated Apr. 11, 2018.

EFFICIENT RECOVERY OF VALUABLE COMPONENTS FROM BIOMASS CATALYTIC PYROLYSIS EFFLUENT

FIELD OF THE INVENTION

The invention relates to improved fractionation of the products of a biomass catalytic pyrolysis process (Bio-TCat). The invention provides an efficient fractionation method for the recovery of benzene, toluene and xylenes (collectively termed BTX) and by-products (off gas, water, phenolic oil and naphthalene-rich oil) present in a Bio-TCat effluent stream.

BACKGROUND OF THE INVENTION

The Bio-TCat process involves the conversion of biomass in a catalytic fluid bed reactor to produce a mixture of aromatics, olefins and a variety of other materials. It is related to the Catalytic Fast Pyrolysis ("CFP") technology but the conversion occurs over contact times between the catalyst and biomass than are greater than typical CFP processing. The aromatics produced by Bio-TCat include benzene, toluene, xylenes and naphthalene, among other aromatics. The olefins include ethylene, propylene and lesser amounts of higher molecular weight olefins. It is a general goal of the Bio-TCat technology to provide high yields of BTX as these are usually the most valuable products.

The raw effluent from a Bio-TCat process is a complex mixture that comprises aromatics, olefins, oxygenates, paraffins, $H_2$, CO, $CO_2$, water, char, ash, coke, catalyst fines and a host of other compounds, but generally very little bio-oil. Manufacture, separation and recovery of the various components, especially those found to be more valuable, from this complex mixture is increasingly important.

In U.S. Pat. Nos. 8,277,643; 8,864,984; U. S. Patent Publication 2012/0203042 A1; U. S. Patent Publication 2013/0060070 A1, U. S. Patent Publication 2014/0027265 A1; and U. S. Patent Publication 2014/0303414 A1, each incorporated herein by reference in its entirety, apparatus and process conditions suitable for catalytic fast pyrolysis are described.

WO2012/092075A1 describes a method for the separation of product from a biomass pyrolysis system for the production of cellulosic bio-oils. The effluent treated therein differs considerably from that of a Bio-TCat process, and so the problems implicated. For example, char in Bio-TCat effluent is present in a low extent since it is filtered in the cyclones of the reaction section, whereas a biomass pyrolysis effluent contains a significant amount of char that should be treated rapidly. That disclosure addresses the problem of rapid quenching for minimizing undesired polycondensation and thermal degradation, but it does not address the problem of the removal of phenolic compounds before water condensation and the possibility of performing the absorption of desired compounds using an internal stream of the process.

WO2016/004248A2 describes a method for recovering aromatic chemicals from the product stream of a catalytic pyrolysis process comprising: quenching the product with process stream water; separating a first vapor phase; recovering aromatics from the first vapor phase; and recovering oxygenates from the first liquid phase product. With this configuration, water is condensed with some heavy hydrocarbons, some of which are oxygenated. Their affinity with water will induce high water pollution. According to the example of this patent the level of cresol and phenol in water can reach 7400 wt ppm (ppmw), a major issue for waste water treatment.

In light of current commercial practices and the disclosures of art, a simple economical method for fractionation and recovery of benzene, toluene and xylenes (BTX) and by-products (off gas, water, phenolic oil and naphthalene-rich oil) present in a Bio-TCat effluent stream is needed. The present invention provides such a method.

SUMMARY OF THE INVENTION

The present invention provides a process for separation of a biomass catalytic pyrolysis process effluent comprising at least the following steps:

a) fractionating said effluent to produce a naphthalene-rich oil effluent, a phenolic oil effluent, and a gaseous effluent comprising off gas, water and gaseous BTX, and b) separating and partially condensing said gaseous effluent of step a) comprising off gas, water and gaseous BTX to produce a gaseous effluent comprising off gas and gaseous BTX, a liquid effluent comprising hydrocarbons including hydrocarbons selected from the group consisting of benzene, toluene, xylenes and combinations thereof (for example mainly BTX), and a liquid effluent comprising water and less than 1,000 ppmw, or less than 500 ppmw, or less than 300 ppmw, such as 50 ppmw or less, for example from 10 to 50 ppmw, phenolic compounds.

This process comprises an efficient, improved fractionation scheme for the separation of the different products of the effluent from a biomass catalytic pyrolysis reaction system. The method provides for effectively separating and recovering desirable aromatic products (benzene, toluene and xylenes), and by-products (off gas, water, phenolic oil and naphthalene-rich oil). Effluent from the reaction section of a biomass catalytic pyrolysis process has optionally already passed through cyclones to separate catalyst, char and gases. Effluent from the reaction section preferably contains only solid particulates smaller than 10 µm.

In an embodiment of the present invention, the fractionation scheme for the separation of the different products of the effluent from a biomass Bio-TCat reaction system comprises cooling and heat recovery. The effluent feed to step a) may be cooled in a heat exchanger without reaching the condensation temperature. Heat recovered may be used for vapor generation or heating of an internal process stream.

The combination of steps a) and b), i.e. an aspect of the present invention, allows separating a naphthalene-rich oil, a phenolic oil, a liquid hydrocarbon effluent (mainly BTX), and liquid water from the effluent stream and vapor stream (still containing valuable gaseous BTX) and absorption of the BTX present in the gaseous effluent from step b) in a lean oil, and regeneration of the lean oil used as absorbent liquid.

Further, an embodiment of the invention comprises steps:

a1) optionally cooling the biomass catalytic pyrolysis effluent, such as in a heat exchanger at a temperature whereby condensation is avoided, a2) optionally quenching the biomass catalytic pyrolysis effluent or effluent of step a1) if step a1) is performed, such as by contact with a naphthalene-rich oil, a3) optionally separating tar from the biomass catalytic pyrolysis effluent or effluent from step a1) or effluent from step a2) if step a1) and/or step a2) are performed, a) fractionating the biomass catalytic pyrolysis effluent or effluent from step a1), and/or step a2), and/or step a3) to produce a naphthalene-rich oil effluent, a phenolic oil effluent, and a gaseous effluent comprising off gas, water and gaseous BTX, b) separating and partially condensing the gaseous effluent from step a) comprising off gas, water and gaseous BTX to produce a gaseous effluent comprising off gas and gaseous BTX, a liquid effluent comprising hydrocarbons including hydrocarbons selected from the group consisting of benzene, toluene, xylenes and combinations thereof, and a liquid effluent comprising water and less than 1,000 ppmw, or less than 500 ppmw, or less than 300 ppmw, such as 50 ppmw or less, for example from 10 to 50 ppmw, phenolic compounds, and c) optionally recovering BTX from the liquid effluent comprising hydrocarbons and/or the gaseous effluent of step b).

Further, optional step c) of recovering BTX may comprise an absorption step c1) of the gaseous effluent from step b) followed by a distillation or fractionation step c2) to separate product comprising BTX and lean oil. The absorption step c1) may comprise contacting the gaseous effluent from step b) with a lean oil in an absorption column to result in a rich oil phase, and feed comprising the rich oil phase of step c1) may be fractionated in step c2) to recover at least BTX and lean oil. The feed to fractionation step c2) may comprise the rich oil phase from step c1), phenolic oil effluent from step a), and/or the liquid effluent containing hydrocarbons from step b).

The invention is useful in providing a three-fold benefit to the fractionation of biomass catalytic pyrolysis process effluent, for example, a biomass Bio-TCat effluent, previously found in the art, i.e.: (i) limitation of fouling and water emulsions problems due to the condensation of tars first in the process and the condensation of hydrocarbons with boiling temperature greater than 150° C. before water; (ii) limitation of the oxygenated compounds content, particularly that of phenolic and cresolic compounds, in the water effluent improving its treatability; and (iii) recovery of a BTX stream with low content of oxygenated compounds. In particular regarding phenolic compounds in the water effluent intended for wastewater treatment, we know that high concentrations, such as greater than 1,000 ppmw, of phenolic compounds are toxic to wastewater treatment bacteria. Though such bacteria can easily tolerate 50 ppmw or less of such compounds in the water being treated, they can be acclimated over time to higher levels up to 1,000 ppmw, but it is most desirable to have the lowest possible amount of phenolic compounds in effluent to be treated as wastewater, for example, the liquid effluent comprising water of step b).

Therefore, advantages of the present invention include a separation process of a Bio-TCat process effluent comprising separation of phenolic oil effluent and particularly phenolic and cresolic compounds from the Bio-TCat effluent. This limits clogging of the columns and eventual water/hydrocarbon emulsion formation problems, and also limits the phenol content in water, and the hydrocarbons with boiling temperature greater than 150° C. content in water.

DETAILED DESCRIPTION OF THE INVENTION

Figure 1:
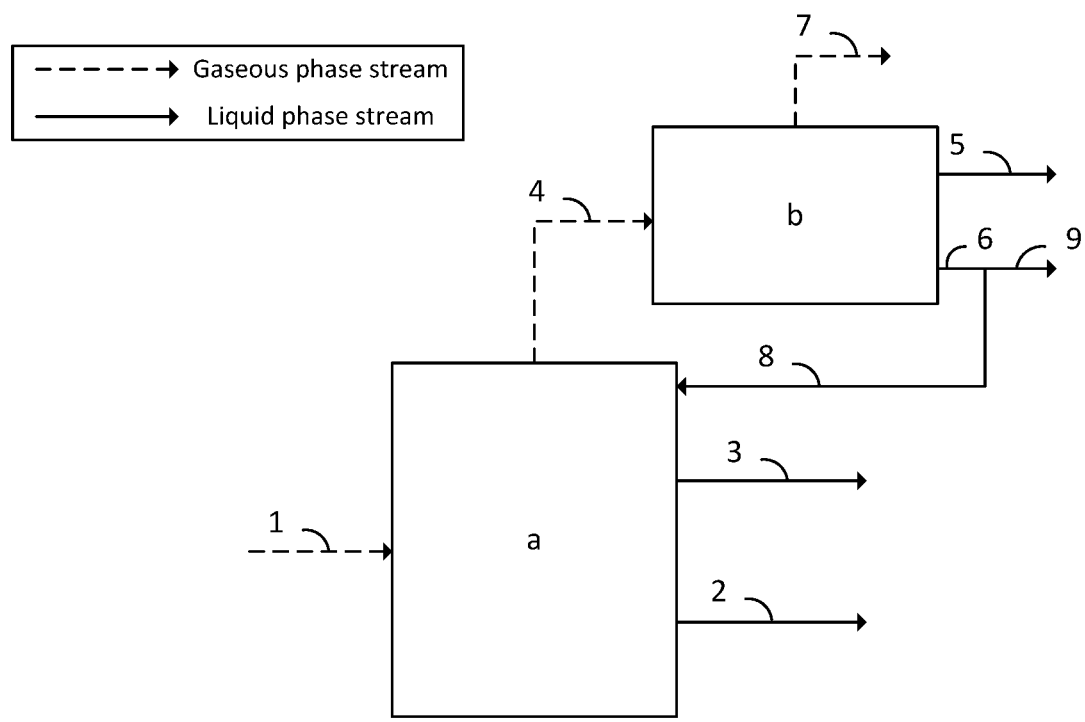
FIG. 1 is a schematic of the separation process of the invention.

As used herein, the term "aromatic" or "aromatic compound" refers to a hydrocarbon compound or compounds comprising one or more aromatic groups such as, for example, single aromatic ring systems (e.g., benzyl, phenyl, etc.) and fused polycyclic aromatic ring systems (e.g., naphthyl, 1,2,3,4-tetrahydronaphthyl, etc.). Examples of aromatic compounds include, but are not limited to, benzene, toluene, indane, indene, 2-ethyl toluene, 3-ethyl toluene, 4-ethyl toluene, trimethyl benzene (e.g., 1,3,5-trimethyl benzene, 1,2,4-trimethyl benzene, 1,2,3-trimethyl benzene, etc.), ethylbenzene, styrene, cumene, propylbenzene, xylenes (e.g., p-xylene, m-xylene, o-xylene), naphthalene, methyl-naphthalene (e.g., 1-methyl naphthalene), anthracene, 9,10-dimethylanthracene, pyrene, phenanthrene, dimethylnaphthalene (e.g., 1,5-dimethylnaphthalene, 1,6-dimethylnaphthalene, 2,5-dimethylnaphthalene, etc.), ethylnaphthalene, hydrindene, methyl-hydrinedene, and dimethyl-hydrindene. Single-ring and/or higher ring aromatics may also be produced in some embodiments. Aromatics also include single and multiple ring compounds that contain heteroatom substituents, i.e., phenol, cresol, benzofuran, aniline, indole, etc.

As used herein, the term "biomass" is given its conventional meaning in the art and is used to refer to any organic source of energy or chemicals that is renewable. Its major components can be: (1) trees (wood) and all other vegetation; (2) agricultural products and wastes (corn, fruit, garbage ensilage, etc.); (3) algae and other marine plants; (4) metabolic wastes (manure, sewage), and (5) cellulosic urban waste. Examples of biomass materials are described, for example, in Huber, G. W. et al. "Synthesis of Transportation Fuels from Biomass: Chemistry, Catalysts, and Engineering," Chem. Rev. 106, (2006), pp. 4044-4098.

Biomass is conventionally defined as the living or recently dead biological material that can be converted for use as fuel or for industrial production. The criterion as biomass is that the material should be recently participating in the carbon cycle so that the release of carbon in the combustion process results in no net increase averaged over a reasonably short period of time (for this reason, fossil fuels such as peat, lignite and coal are not considered biomass by this definition as they contain carbon that has not participated in the carbon cycle for a long time so that their combustion results in a net increase in atmospheric carbon dioxide). Most commonly, biomass refers to plant matter grown for use as biofuel, but it also includes plant or animal matter used for production of fibers, chemicals or heat. Biomass may also include biodegradable wastes or byproducts that can be burned as fuel or converted to chemicals, including municipal wastes, green waste (the biodegradable waste comprised of garden or park waste, such as grass or flower cuttings and hedge trimmings), byproducts of farming including animal manures, food processing wastes, sewage sludge, and black liquor from wood pulp or algae. Biomass excludes organic material which has been transformed by geological processes into substances such as coal, oil shale or petroleum. Biomass is widely and typically grown from plants, including *miscanthus*, spurge, sunflower, switchgrass, hemp, corn (maize), poplar, willow, sugarcane, and oil palm (palm oil) with the roots, stems, leaves, seed husks and fruits all being potentially useful. Processing of the raw material for introduction to the processing unit may vary according to the needs of the unit and the form of the biomass. Biomass can be distinguished from fossil-derived carbon by the presence of 14C in amounts significantly above that found in fossil fuels.

As used herein, the term "oxygenated compound" includes any organic compound that contains at least one atom of oxygen in its structure such as alcohols (methanol, ethanol, etc.), acids (e.g., acetic acid, propionic acid, etc.), aldehydes (e.g., formaldehyde, acetaldehyde, etc.). esters (e.g., methyl, acetate, ethyl acetate, etc.), ethers (e.g., dimethyl ether, diethyl ether, etc.), aromatics with oxygen-containing substituents (e.g., phenol, m-cresol, o-cresol, p-cresol, xylenols, naphthols, benzoic acid etc.), cyclic ethers, acids, aldehydes, and esters (e.g., furan, furfural, etc.), and the like. Oxygenated compounds typically boil in a temperature range from 20 to 575° C.

As used herein, the terms "phenolic oil" and "oxygenated oil" include aromatics with oxygen containing substituents (e.g., phenol, m-cresol, o-cresol, p-cresol, xylenols, etc.) and other compounds from Bio-TCat reactor effluent typically boiling in the range from 80 to 220° C. (e.g. benzene, toluene, p-xylene, m-xylene, o-xylene, indane, indene, 2-ethyl toluene, 3-ethyl toluene, 4-ethyl toluene, 1,3,5-trimethyl benzene, 1,2,4-trimethyl benzene, 1,2,3-trimethyl benzene, ethylbenzene, styrene, cumene, propylbenzene, naphthalene, etc). The phenolic oil and the oxygenated oil are streams typically boiling in a temperature range from 80 to 220° C. The oxygenated oil has a lower content of xylenes than the phenolic oil.

The term "naphthalene-rich oil" as used herein includes naphthalene, methyl-naphthalenes (e.g., 1-methyl naphthalene, 2-methyl naphthalene, etc.), dimethyl-naphthalenes (e.g., 1,5-dimethylnaphthalene, 1,6-dimethylnaphthalene, 2,5-dimethylnaphthalene, etc.), ethyl-naphthalenes, other polyaromatic compounds (e.g., anthracene, 9,10-dimethyl-anthracene, pyrene, phenanthrene, etc.) and aromatics and polyaromatics that contain heteroatom (e.g., oxygen, sulfur, nitrogen, etc.). The naphthalene-rich oil is a stream typically boiling in a temperature range of from about 200 to about 575° C.

The term "off gas" as used herein includes $H_2$, CO, $CO_2$, COS, $N_2$ and hydrocarbons containing 1 to 6 atoms of carbon (e.g., methane, ethane, ethylene, propane, propylene, n-butane, isobutane, isobutene, 1-butene, 2-butene, pentane, pentene, hexane, hexene, etc.).

The term "tars" or "tar" as used herein is a stream typically boiling in a temperature range of from about 250 to about 575° C., the stream usually dark brown or black bituminous and viscous.

As used herein, the term "lean oil" is the oil used to absorb the BTX in the absorption column. The term "lean" means that the oil is "lean" in BTX. The "lean oil" typically boils at a temperature greater than 145° C. The lean oil is the liquid that enters the absorption column.

As used herein, the term "rich oil" is the oil exiting the absorber that is rich in absorbed BTX. The rich oil is the liquid that exits the absorption column.

The present invention relates to the fractionation of a biomass Catalytic Fast Pyrolysis (Bio-TCat) process reactor effluent.

Bio-TCat reactor effluent is typically at a temperature of 300 to 620° C., such as 400 to 575° C., for example 500 to 550° C., and a pressure of 100 to 1500 kPa, such as 200 to 1000 kPa, for example 300 to 700 kPa (pressures expressed as absolute pressures).

Bio-TCat reactor effluent typically comprises aromatics, olefins, oxygenated compounds, paraffins, $H_2$, CO, $CO_2$, water, char, ash, coke, catalyst fines, and a host of other components. On a water-free and solids-free basis the reactor effluent can comprise 20 to 60%, such as 25 to 55%, for example 30 to 50% CO; 10 to 50%, such as 15 to 40%, for example 20 to 35% $CO_2$; 0.1 to 10%, such as 0.2 to 5%, for example 0.3 to 1% $H_2$; 2 to 15%, such as 3 to 10%, for example 4 to 8% $CH_4$; 2 to 40%, such as 3 to 35%, for example 4 to 30% BTX; 0.1 to 10%, such as 0.2 to 5%, for example 0.3 to 3% oxygenated compounds; and 1 to 15%, such as 2 to 10%, for example 3 to 6% $C_2$-$C_4$ olefins.

On a water-free and solids-free basis the reactor effluent can comprise a vapor mixture where the sum of CO and $CO_2$ is 30 to 90%, such as 40 to 85%, for example 50 to 80%.

The invention provides a method for the recovery of the BTX (benzene, toluene, xylenes) and the by-products (off gas, water, phenolic oil and naphthalene-rich oil) from the reactor effluent stream.

In one embodiment, rapid cooling of the Bio-TCat effluent can be performed. The cooling is rapid in order to prevent polycondensation reactions from building up heavy by-products. The biomass effluent is accordingly first cooled in a heat exchanger. The heat recovered can be either used for vapor generation or for heating an internal process stream. The heat exchanger outlet temperature is preferably such that the condensation of the reactor effluent stream is avoided in order to prevent tar deposits. This temperature is normally comprised between 150 and 500° C., for example 200 to 400° C. depending on the kind of biomass treated and the gas rate necessary to fluidize the reactor bed. The heat exchanger typically operates at a pressure of 100 to 1500 kPa, such as 200 to 1000 kPa, for example 300 to 700 kPa (pressures expressed as absolute pressures).

Overall, the present invention comprises at least a separation of said Bio-TCat effluent to produce a naphthalene-rich oil effluent, a phenolic oil effluent, liquid comprising water, liquid comprising hydrocarbons (mainly BTX) and a gaseous effluent comprising off gas and gaseous BTX. The aim of the invention (steps a) and b)) is the separation of the naphthalene-rich oil, phenolic oil and water of the Bio-TCat effluent stream. Separation can take place in a single separation device or in separate separation devices. The basic fractionation scheme of the present invention is represented in FIG. 1.

Referring more particularly to FIG. 1, biomass catalytic pyrolysis process effluent is provided to fractionation system "a" via stream 1. Naphthalene-rich oil is removed from system "a" via stream 2; phenolic oil is removed via stream 3; and gaseous effluent comprising off gas, BTX and water is removed via stream 4. The gaseous effluent of stream 4 is passed to separation system "b", from which liquid effluent comprising water and limited phenolic compounds, such as less than 1,000 ppmw, or less than 500 ppmw, or less than 100 ppmw, such as 50 ppmw or less, for example from 10 to 50 ppmw, phenolic compounds, is removed via stream 5; liquid effluent comprising hydrocarbons including hydrocarbons selected from the group consisting of benzene, toluene, xylenes and combinations thereof is removed via stream 6; and gaseous effluent comprising off gas and gaseous BTX is removed via stream 7. A cut of stream 6 is passed to system "a" as reflux via stream 8, and the remainder of stream 6 is taken via stream 9.

More particularly, the present invention provides a process for separation of a biomass catalytic pyrolysis process effluent comprising at least the following steps:

a) fractionating said catalytic pyrolysis process effluent to produce a naphthalene-rich oil effluent, a phenolic oil effluent, and a gaseous effluent comprising off gas, water and gaseous BTX, and b) separating and partially condensing the gaseous effluent of step a) comprising off gas, water and gaseous BTX to produce a gaseous effluent comprising off gas and gaseous BTX, a liquid effluent comprising hydrocarbons (mainly BTX) and a liquid effluent comprising water and less than 1,000 ppmw, or less than 500 ppmw, or less than 300 ppmw, such as 50 ppmw or less, for example from 10 to 50 ppmw, phenolic compounds.

Step a) can be performed in a fractionation column.

Figure 2:
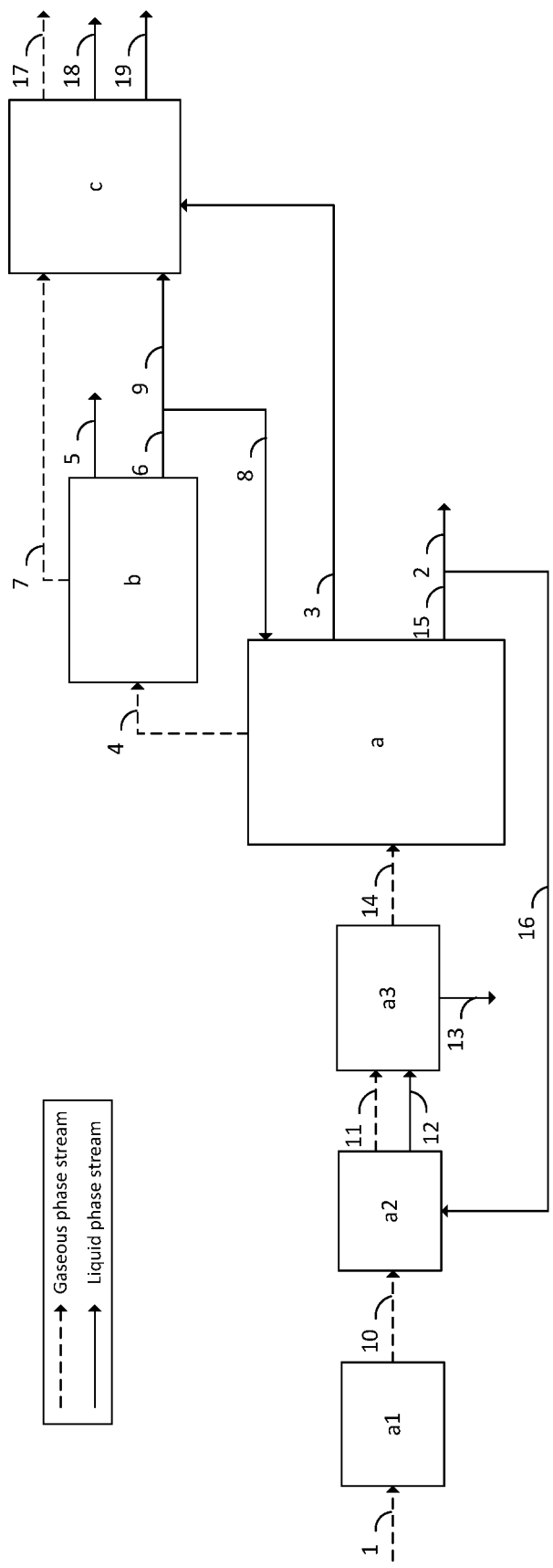
FIG. 2 is a more detailed schematic of a preferred embodiment of the invention, including a downstream section to improve BTX recovery.

In a preferred embodiment of the present invention, represented by FIG. 2, step a) and step b) may comprise the following sequence: cooling the Bio-TCat effluent, quenching the Bio-TCat effluent with naphthalene-rich oil from step a), removing tars in a separation drum, separating naphthalene-rich oil and phenolic oil in a fractionation column, and condensing water and hydrocarbons. Optional cooling in step a1) can be performed by heat exchange in a heat exchanger at a temperature whereby condensation is avoided, followed by optional quenching in step a2) by contact with a naphthalene-rich oil. The naphthalene-rich oil can be recycled from fractionation step a).

Referring more particularly to FIG. 2, biomass catalytic pyrolysis process effluent is provided via stream 1 to optional cooling system "a1", such as a heat exchanger. Cooled pyrolysis process effluent is then passed via stream 10 to optional quenching system "a2". Gaseous effluent from the quench system is then passed via stream 11, and liquid effluent from the quench system is passed via stream 12, to separation system "a3". Tars are removed from the separation system via stream 13, and cooled process effluent after tar removal is passed from the separation drum via stream 14. Stream 14 is then fed to fractionation system "a". Naphthalene-rich oil is removed from system "a" via stream 15; phenolic oil is removed via stream 3; and gaseous effluent comprising off gas, BTX and water is removed via stream 4. A naphthalene-rich oil cut is removed from stream 15 via stream 16 and cycled to quenching system "a2". The remaining naphthalene-rich oil of stream 15 is removed via stream 2. Stream 4 is fed to separation system "b", from which liquid effluent comprising water is removed via stream 5; liquid effluent comprising hydrocarbons including hydrocarbons selected from the group consisting of benzene, toluene, xylenes and combinations thereof is removed via stream 6; and gaseous effluent comprising off gas and gaseous BTX is removed via stream 7. A cut of stream 6 is passed to system "a" as reflux via stream 8, and the remainder of stream 6 is passed via stream 9 to optional BTX recovery system "c" along with the contents of streams 3 and 7. From recovery system "c" is passed stream 17 comprising off gas, stream 18 comprising BTX, and stream 19 comprising oxygenated oil.

In one embodiment, a quench of the Bio-TCat effluent stream can be performed in step a2) before being sent to the fractionation column of step a) by direct contact with a naphthalene-rich oil which comes from the bottom stream of the fractionation column of step a). The naphthalene-rich oil is composed mainly of hydrocarbons (HC). Direct contact with a HC fluid is selected because it allows condensation of HC without water. Stability of the naphthalene-rich oil could be an issue. Temperature of quench is preferably between 150 and 250° C., generally between 180 and 220° C., in order to avoid naphthalene-rich oil degradation and prevent tar deposits and condensation. The pressure of the quench is 100 to 1500 kPa, such as 200 to 1000 kPa, for example 300 to 700 kPa (pressures expressed as absolute pressures).

Separation and removal of the tars (the heaviest components of Bio-TCat effluent) can be performed in step a3) by means of a separation drum, preferably placed before the fractionation column and preferably after the quench of the Bio-TCat effluent. This step depends on the composition of the effluent. In case of severe tar issues, two drums in parallel (one in spare) can be necessary to reach high stream factor rate for the unit.

After optional cooling, quench and tar removal, the Bio-TCat effluent is sent to step a) performed in a fractionation column based on boiling point. This column performs a separation of the naphthalene-rich oil and phenolic oil, and comprises a reflux stream, a bottom stream, a sidedraw and a head stream.

An external reflux system can be used for control of the functioning of the column and increases the hydrocarbon partial pressure preventing water condensation. The reflux stream is composed of the liquid comprising hydrocarbons (mainly BTX) obtained by condensation of the vapor exiting the head of the column.

A bottom stream composed of naphthalene-rich oil of which at least a part can be used for optional quenching of the Bio-TCat effluent. This stream can further optionally be used to cool down the bottom section of the column by means of a pumparound. The fraction of the stream not used for the quenching, composed of slurry with catalyst fines and char can be purged.

A sidedraw stream may be used to extract the phenolic oil with a higher boiling point than that of water, particularly phenols and cresols. The aim of the sidedraw is to avoid the condensation of oxygenated compounds, particularly phenols, along with water. It is known that the presence of phenol in the waste water stream will negatively impact its treatment, especially if directly sent to biological waste water treatment. Therefore the content of phenol in the waste water should be controlled. This sidedraw contains not only oxygenated aromatics but some BTX that can be recovered in later stages of the process. If phenol and cresols were condensed in the naphthalene-rich oil, BTX losses would be induced.

The vapor phase overhead stream without components having a boiling point higher than 200° C. is a vapor comprising off gas, water and vapor-phase BTX. The oxygenated compounds fraction is controlled so that they exit the column in the sidedraw. This vapor phase stream is therefore composed of aromatic compounds (BTX), water and off gas.

The column is operated controlling reflux and pumparounds (temperature and rates), targeting:
Effluent washing in the bottom section of the column (removal of all small solid particulates).
Condensation and separation of two cuts:
A phenolic oil cut in which naphthalene content is controlled.
A naphthalene-rich oil where valuable product losses are limited.
No water condensation in the column (through partial pressure and temperature control at the top of the column).

The pressure of the fractionation column is between 100 and 1500 kPa, such as 200 and 1000 kPa, for example from 300 to 700 kPa (pressures expressed as absolute pressures). The temperature of the fractionation column is between 70 and 250° C., for example from 100 to 220° C.

The present invention then further comprises at least a separation and partial condensation step b) of said gaseous effluent comprising off gas, water and gaseous BTX from step a) to produce a gaseous effluent comprising off gas and gaseous BTX, a liquid comprising hydrocarbons (mainly BTX) and a liquid effluent comprising water.

The gaseous effluent at the top of the fractionation column from step a) is cooled to partially condense water and a HC liquid stream rich in BTX (partially used as reflux for the fractionation column). The two liquid products and the gaseous stream are separated. This step comprises either an exchanger or water washing column or a similar cooling system and a phase separator device (separator drum for example). A portion of the liquid comprising hydrocarbons (BTX) is routed back as a reflux to the fractionation column of step a).

The pressure of the water condensation section is typically between 100 and 1500 kPa, such as 200 and 1000 kPa, for example from 300 to 700 kPa (pressures expressed as absolute pressures). The temperature of the water condensation section is typically between 5 and 100° C., for example from 20 to 50° C.

The gaseous stream comprising off gas and gaseous BTX exiting from step b) contains a considerable amount of aromatics, particularly benzene. Consequently the present invention can take advantage of an additional absorption and distillation section dedicated to BTX recovery improvement and one embodiment could be absorption with lean oil. A selected lean oil enters the top of an absorption column absorbing the aromatics (BTX) of the gaseous stream comprising off gas and gaseous BTX from step b) flowing upwards. The gaseous stream comprising off gas and gaseous BTX from step b) section may be compressed before entering the absorption column in order to increase the absorption pressure and improve the efficiency of the absorption. The pressure of the absorption column is between 100 and 2000 kPa, such as 200 and 1500 kPa, for example from 300 to 1000 kPa (pressures expressed as absolute pressures). The temperature of the absorption column is between 0 and 100° C., such as 20 and 80° C., for example from 30 to 70° C.

The rich oil stream containing the lean oil and absorbed BTX and exiting from the absorption column bottom can then be sent in a distillation section to separate the products and regenerate the lean oil that is then recycled to the absorption column. The distillation section may include a single or several distillation columns according to the lean oil boiling temperature. The feed of this distillation section includes the rich oil but may also include the liquid comprising hydrocarbons (BTX) and the phenolic oil from the purification section (streams from fractionation column and water condensation). The pressure of the distillation section is typically between 100 and 1000 kPa, such as 100 and 700 kPa, for example from 100 to 500 kPa (pressures expressed as absolute pressures). The temperature of the distillation section is between 20 and 300° C., for example from 20 to 250° C.

The lean oil may be internal, i.e. composed of compounds produced by biomass Bio-TCat and present in Bio-TCat reactor effluent, or external, i.e. imported from external sources (meaning initial inventory and make-up to compensated losses). Whatever the lean oil (internal or external), it should have a boiling temperature greater than the boiling temperature of the hydrocarbons intended to be absorbed in the absorption column. Because BTX are intended to be absorbed, the boiling temperature of the lean oil must be greater than 145° C.

When considering an external fluid acting as lean oil, a makeup maybe necessary because a fraction of the lean oil goes in the off gas and cannot be recycled to the absorption column and the lean oil inventory must be maintained. An example of external lean oil can be a diesel cut with a distillation range from 220 to 350° C. for example.

An example of internal lean oil may be a cut with boiling point range from 145 to 220° C. and including phenol, cresols, hydrocarbons with 8 to 10 atoms of carbon (e.g., indane, indene, tri-methylbenzene, ethyl-toluene, naphthalene, etc). When selecting an internal stream as absorption lean oil, lean oil composition should be controlled in order to limit the content of species which freezing point is close or higher than absorption column temperature (naphthalene, cresols, etc.). The lean-oil make-up is then performed routing the phenolic oil to the absorption section. Freezing point issues will then be controlled thanks to first fractionation column tuning parameters. Depending on the final cut point of the BTX cut, a bottom product drain can be necessary to export extra materials.

In particular, preferred embodiments include:

A process for separation of components in a biomass catalytic pyrolysis process effluent, comprising steps:

a1) optionally cooling the biomass catalytic pyrolysis effluent, a2) optionally quenching the biomass catalytic pyrolysis effluent or effluent from step a1) if step a1) is performed, a3) optionally separating tar from the biomass catalytic pyrolysis effluent or effluent from step a1) or effluent from step a2) if step a1) and/or step a2) are performed, a) fractionating the biomass catalytic pyrolysis effluent or effluent from steps a1) or a2) or a3) if steps a1) and/or a2) and/or a3) are performed to produce a naphthalene-rich oil effluent, a phenolic oil effluent, and a gaseous, i.e. vapor phase, effluent containing off gas, water and BTX, b) separating and partially condensing the gaseous effluent from step a) comprising off gas, water and gaseous BTX to produce a gaseous effluent comprising off gas and gaseous BTX, a liquid effluent comprising hydrocarbons including hydrocarbons selected from the group consisting of benzene, toluene, xylenes and combinations thereof, and a liquid effluent comprising water and 50 ppmw or less, for example from 10 to 50 ppmw, phenolic compounds, and c) optionally recovering BTX from the liquid phase effluent comprising hydrocarbons and/or the gaseous effluent of step b).

The fractionation step a) can comprise separating individual streams of naphthalene-rich oil, a phenolic oil, and a vapor phase containing off gas, water and BTX. Optional step c) for recovering BTX may comprise an absorption step c1) of the gaseous stream from step b) followed by a distillation or fractionation step c2) to separate products and the lean oil.

More particularly, optional step c) of recovering BTX may comprise step c1), an absorption of the gaseous stream from step b) thus recovering aromatics. Absorption step c1) may comprise contacting the gaseous stream from step b) with a lean oil in an absorption column, and after absorption the rich oil phase obtained is fractionated in step c2) to recover at least BTX, and said lean oil which can be recycled to absorption step c1).

Fractionation step c2) may include one or several distillation columns.

The feed to fractionation step c2) includes the rich oil phase from step c1) and may also include the phenolic oil from step a) and/or the liquid phase containing hydrocarbons (BTX) from step b).

The lean oil used for absorption step c1) can be oil produced by biomass Bio-TCat, this oil including compounds present in Bio-TCat reactor effluent. The lean oil used for absorption step c1) can be oil not produced by biomass Bio-TCat, for example a diesel cut, and/or an external stream of aromatics.

Optional cooling in step a1) can be performed by heat exchange in a heat exchanger, at a temperature whereby condensation is avoided, followed by optional quenching in step a2) by contact with a naphthalene-rich oil. The naphthalene-rich oil can be recycled from fractionation of step a).

Partial condensation in step b) can be performed by quenching the gaseous effluent from step a) by contact with water. Further, partial condensation in step b) can be performed by heat exchange in a heat exchanger.

Thus, the invention further can involve a separation process comprising separating, from a biomass catalytic pyrolysis process effluent from which tars have been optionally removed, a naphthalene-rich oil phase, a phenolic oil, and a gaseous stream containing off gas, water and gaseous BTX, whereby said gaseous stream can be partially condensed to separate liquid water and liquid hydrocarbons from gaseous off gas and BTX.

Moreover, an embodiment of the invention can involve a process for separation of components in a biomass catalytic pyrolysis process effluent, comprising steps:

a3) separating tar from said biomass catalytic pyrolysis effluent, a) fractionating effluent from step a3) to produce a naphthalene-rich oil effluent, a phenolic oil effluent, and a gaseous effluent stream containing off gas, water and BTX, and b) separating and partially condensing the gaseous effluent stream from step a) to separate liquid water and liquid hydrocarbons from gaseous off gas and BTX.

Without further elaboration, it is believed that one skilled in the art can, using the preceding description, utilize the present invention to its fullest extent. The preceding preferred specific embodiments are, therefore, to be construed as merely illustrative, and not limiting of the remainder of the disclosure in any way whatsoever.

In the foregoing and in the example of an embodiment of the invention provided hereafter, all temperatures are set forth uncorrected in degrees Celsius and, all parts and percentages are by weight, unless otherwise indicated.

Figure 3:
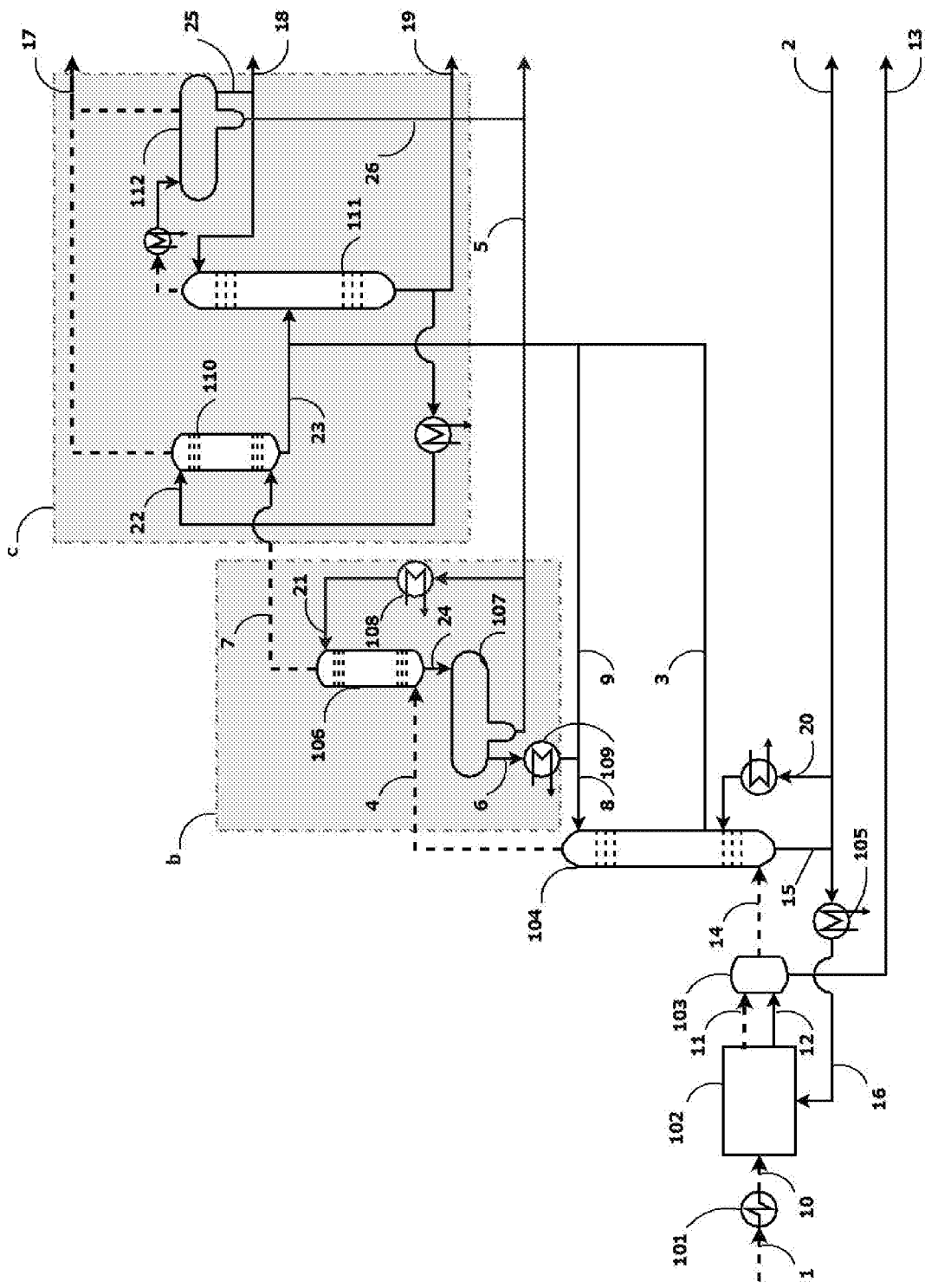
FIG. 3 is a detailed process diagram of a preferred embodiment of the invention.

Example (see FIG. 3)

1) Bio-TCat Effluent Composition

Table 1 shows the composition of the Bio-TCat effluent considered in this example. Table 2 shows the detailed composition of the Bio-TCat effluent considered in this example. In the tables, stream concentrations are in wt % and flow rates are in kg/hour. Stream labels refer to FIG. 3.

TABLE 1

| | Composition (wt %) | | | | | | | |
|---|---|---|---|---|---|---|---|---|
| | Bio-TCat effluent (1) | Tar (13) | Naphthalene-rich oil (2) | Phenolic oil (3) | Off gas (17) | BTX (18) | Oxygenated oil (19) | Water (5) |
| Water | 14.94 | 0.11 | 0.12 | 0.27 | 0.94 | 0.09 | | 99.79 |
| Incondensables | 76.48 | 0.12 | 0.12 | 0.16 | 98.35 | 0.72 | | 0.02 |
| BTX | 6.36 | 0.72 | 0.76 | 43.25 | 0.17 | 93.55 | 0.01 | 0.18 |
| Other mono-aromatics | 0.49 | 0.24 | 0.27 | 22.71 | 0.18 | 3.31 | 18.88 | 0.01 |
| Di-aromatics | 1.02 | 97.3 | 96.28 | 15.38 | 0.03 | | 40.4 | |
| Oxygenated compounds | 0.46 | 1.51 | 2.44 | 18.08 | 0.11 | 1.15 | 40.7 | |
| Other compounds | 0.2 | | | 0.14 | 0.17 | 1.14 | | |
| TOTAL (% wt) | 100 | 100 | 100 | 100 | 100 | 100 | 100 | 100 |
| Total flowrate (kg/h) | 248,230 | 505 | 1,341 | 5,000 | 192,861 | 16,427 | 1,754 | 35,343 |

Water: $H_2O$.

Incondensables: $H_2$, CO, $CO_2$, COS, methane, ethane, ethylene, propane, propene, n-butane, i-butane, 1-butene, cis2-butene, trans2-butene.

BTX: benzene, toluene, o-xylene, m-xylene, p-xylene.

Other mono-aromatics: ethylbenzene, styrene, 3-ethyltoluene, 4-ethyltoluene, n-propylbenzene, cumene, 1,2,3-trimethylbenzene, indane, indene.

Di-aromatics: naphthalene, 2-methylnaphthalene, 2-ethylnaphthalene, 2,7-dimethylnaphthalene.

Oxygenated compounds: 2-propanol, acetone, methyl-vinyl-ketone, phenol, m-cresol, o-cresol.

Other compounds: Acetonitrile, dimethylsulphide, dimethyldisulphide, thiophene, 2-methylthiophene, 3-methylthiophene, n-pentane, isopentane, 1-pentene, n-hexane, 1-hexene, n-heptane, 1-heptene, n-octane, 1-octene, n-nonane, 1-nonene.

TABLE 2

| | Composition (wt %) | | | | | | | |
|---|---|---|---|---|---|---|---|---|
| | Bio-TCat Effluent (1) | Tar (13) | Naphthalene-rich oil (2) | Phenolic oil (3) | Off gas (17) | BTX (18) | Oxygenated oil (19) | Water (5) |
| H2O | 14.94 | 0.11 | 0.12 | 0.27 | 0.94 | 0.09 | | 99.79 |
| Hydrogen | 0.4 | | | | 0.51 | | | |
| CO | 39.35 | 0.03 | 0.03 | 0.03 | 50.64 | | | |
| CO2 | 27.38 | 0.06 | 0.06 | 0.1 | 35.2 | 0.41 | | 0.02 |
| Methane | 5.73 | 0.01 | 0.01 | 0.01 | 7.37 | 0.01 | | |

TABLE 2-continued

| | Bio-TCat Effluent (1) | Tar (13) | Naphthalene-rich oil (2) | Phenolic oil (3) | Off gas (17) | BTX (18) | Oxygenated oil (19) | Water (5) |
|---|---|---|---|---|---|---|---|---|
| Ethane | 0.36 | | | | 0.46 | 0.01 | | |
| Ethylene | 2.05 | 0.01 | 0.01 | 0.01 | 2.64 | 0.03 | | |
| Propane | 0.09 | | | | 0.12 | 0.02 | | |
| Propene | 0.99 | 0.01 | 0.01 | 0.01 | 1.26 | 0.16 | | |
| C4 | 0.13 | | | | 0.15 | 0.08 | | |
| Acetone | 0.04 | | | | 0.03 | 0.34 | | |
| Paraffins ($C_5$-$C_9$) | 0.06 | | | 0.13 | 0.04 | 0.36 | | |
| Olefins ($C_5$-$C_9$) | 0.13 | | | 0.01 | 0.13 | 0.63 | | |
| Benzene | 2.17 | 0.13 | 0.14 | 0.47 | 0.16 | 30.72 | | 0.04 |
| Acetonitrile | 0.01 | | | | | 0.13 | | |
| Methylvinylketone | 0.01 | | | | | 0.18 | | |
| 2-Propanol | 0.03 | | | 0.01 | | 0.5 | | |
| Thiophene | | | | | | 0.01 | | |
| 3-methylthiophene | | | | | | 0.01 | | |
| Phenol | 0.06 | 0.03 | 0.04 | 2.92 | 0.02 | 0.13 | 4.45 | |
| Toluene | 3.09 | 0.35 | 0.37 | 1.81 | 0.01 | 46.41 | | 0.06 |
| Ethylbenzene | 0.06 | 0.01 | 0.01 | 1.25 | | 0.88 | | 0.01 |
| m-Xylene | 0.53 | 0.11 | 0.12 | 18.88 | | 7.88 | | 0.04 |
| o-Xylene | 0.23 | 0.06 | 0.06 | 10.09 | | 3.45 | 0.01 | 0.02 |
| p-Xylene | 0.34 | 0.07 | 0.07 | 12 | | 5.09 | | 0.02 |
| Styrene | 0.04 | 0.01 | 0.01 | 1.9 | | 0.6 | 0.01 | |
| 3-Ethyltoluene | 0.04 | 0.02 | 0.02 | 2.2 | 0.01 | 0.52 | 0.18 | |
| 4-Ethyltoluene | 0.04 | 0.01 | 0.01 | 1.85 | 0.01 | 0.48 | 0.09 | |
| n-Propylbenzene | | | | 0.06 | | 0.02 | | |
| Cumene | 0.05 | 0.02 | 0.02 | 2.65 | | 0.79 | 0.02 | |
| 123-Trimethylbenzene | 0.07 | 0.04 | 0.05 | 3.45 | 0.05 | 0.01 | 4.18 | |
| Indane | 0.16 | 0.11 | 0.12 | 8.04 | 0.1 | 0.01 | 12.24 | |
| Indene | 0.03 | 0.02 | 0.03 | 1.31 | 0.01 | | 2.16 | |
| m-Cresol | 0.15 | 1.25 | 2.06 | 6.87 | 0.02 | | 17.59 | |
| o-Cresol | 0.17 | 0.23 | 0.34 | 8.28 | 0.04 | | 18.66 | |
| Naphthalene | 0.68 | 45.69 | 55.2 | 14.47 | 0.03 | | 37.91 | |
| 2-Methylnaphthalene | 0.33 | 47.32 | 39.39 | 0.91 | | | 2.49 | |
| 2-Ethylnaphthalene | | 0.92 | 0.4 | | | | | |
| 2,7-Dimethylnaphthalene | 0.01 | 3.37 | 1.29 | | | | | |
| TOTAL (% wt) | 100 | 100 | 100 | 100 | 100 | 100 | 100 | 100 |
| Total flowrate (kg/h) | 248 230 | 505 | 1 341 | 5 000 | 192 861 | 16 427 | 1 754 | 35 343 |

2) Fractionation System (Referring More Particularly to FIG. 3 Wherein Like Stream and System Labels are as Defined for FIGS. 1 and 2 Above)

Cooling and Heat Recovery (Step a1)

The Bio-TCat effluent (stream 1 of FIG. 3) at 568° C. passes through a heat exchanger 101 of step a1) to recover part of its heat by generating vapor. The outlet temperature is 400° C.

Quench (Step a2)

The stream is further quenched to a temperature of 202° C. in step a2), a device like an annular ring 102 where the effluent stream is contacted with a cool naphthalene-rich oil quench fluid at 200° C. obtained through line 16 after cooling of the effluent from the bottom of the fractionation column 104 of step a) in heat exchanger 105.

Tar Separation Drum (Step a3)

After being quenched to 202° C. the effluent enters a separation drum 103 of step a3) to eliminate the heaviest hydrocarbon molecules (tars) that have been condensed. The purpose of the tar separation drum is to prevent fouling upstream in the fractionation process. It also avoids problems due to the presence of small quantities of hydrocarbon molecules in water. Quench oil rate and temperature are controlled in order to adjust tar condensation. Tar is removed through line 13.

Fractionation Column (Step a)

The vapor from the tar separation drum enters through line 14 into a fractionation column 104 of step a) that operates at 4.2 bar at the top. Temperature is maintained above the temperature at which the majority of water condenses. In this example, the temperature at the top is 120° C., and 20 theoretical trays are used to perform the separation.

This column is used for several purposes:
Removal of the oxygenated compounds (phenol, cresols). The phenolic oil stream is extracted from the column through a sidedraw placed at the theoretical tray 9 through line 3. The main reason for condensing the oxygenated compounds, particularly phenol, in this column is to avoid their condensation along with water further in the system. The advantage is to obtain process water with phenol content lower than 50 ppm so that it could be subjected to a conventional biological waste water treatment.

Condensation of naphthalene-rich oil that is partially used for the direct quench of the Bio-TCat system. This stream 15 is also used to wash the vapor and cool down the bottom section of the column by means of a pump around via line 20. The fraction of the stream not used for quenching, composed of slurry with catalyst fines and char, is purged through line 2.

Continuation of the quenching/fractionation of the Bio-TCat effluent. The vapor stream at the top of the column reaches a temperature of 120° C. According to water partial pressure, the margin to water dew point is about 20° C.

Water Condensation—Water Quench Tower

Once the naphthalene-rich oil and the phenolic oil are removed from the system, water is condensed. In the present example, a water quench tower 106 of step b) is used to limit fouling issues. The water quench tower uses 7 theoretical trays and operates at 4 bar. The vapor stream is recovered at the top of the water quench tower and the bottom stream goes through line 24 to a separation drum 107 where liquid water and liquid HC are separated. A fraction of the water is cooled in heat exchanger 108 to 33° C. and routed through line 21 to the top of the water quench tower 106 to control vapor product temperature (a thermal approach of 3° C. has been used in this example). A fraction of the HC stream in line 8, rich in BTX, is used as reflux for the fractionation column 104. Cooled down at 40° C. in heat exchanger 109, this reflux is used to control the top product temperature and water partial pressure in order to avoid water condensation. The reflux rate is in the illustrated case 170 t/h. The liquid hydrocarbon cut is separated and sent to the distillation section through line 9.

Absorption Column (Step c1)

The vapor stream contains 84% of the total BTX. An absorption column 110 of step c1) is used to recover these valuable products. The absorption column uses a lean oil obtained as a bottom product 22 of a distillation column 111 of step c2) and is mainly composed of cresols and indane. The absorption column has 8 theoretical trays and works at a pressure of 3.7 bar. Ninety-eight % wt of the BTX that enters the absorption column is recovered by the lean oil and the rich oil stream 23 therefrom enters the distillation column 111 to separate products and regenerate the lean oil.

Distillation Column (Step c2)

The distillation column 111 treats the phenolic oil cut, the liquid hydrocarbons (BTX) fraction obtained in the water quench tower 106, and the rich oil that is the absorption liquid containing the BTX. It contains 35 theoretical trays. Four cuts are extracted from this column: the BTX cut through line 18 via line 25 at the reflux drum 112; water through line 26 at the reflux drum; the lean oil routed through line 22 to the absorption column; and an oxygenated oil stream through line 19 at the bottom of the column 111.

An important advantage of this invention compared to that of the state-of-the-art is that phenol content in resulting water is 15 ppm, whereas the content of phenol in the scheme known by the different but start of the art (see WO2016/004248A2, Table 1) is 300 ppm wt, far above the limits of the biological treatment of waste water (such as less than 300 ppmw, preferably 50 ppmw or less).

The preceding example can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for separation of components in a biomass catalytic pyrolysis process effluent, comprising steps:
    a1) cooling the biomass catalytic pyrolysis effluent,
    a2) quenching the resulting effluent of step a1),
    a3) separating tar from the resulting effluent from step a2),
    a) passing the resulting effluent from step a3) directly to a fractionation column where the resulting effluent from step a3) is fractionated to produce a naphthalene-rich oil effluent, a phenolic oil effluent stream extracted from the fractionation column through a sidedraw, and a gaseous effluent comprising off gas, water and gaseous BTX,
    b) separating and partially condensing the gaseous effluent from step a) comprising off gas, water and gaseous BTX to produce a gaseous effluent comprising off gas and gaseous BTX, a liquid effluent comprising hydrocarbons including hydrocarbons selected from the group consisting of benzene, toluene, xylenes and combinations thereof, and a liquid effluent comprising water and less than 300 ppmw phenolic compounds that is sent to water treatment, and
    c) recovering BTX or any component thereof from the liquid effluent comprising hydrocarbons and/or the gaseous effluent of step b).

2. The process of claim 1, wherein quenching step a2) comprises contact with a naphthalene-rich oil.

3. The process of claim 1, wherein cooling in step a1) comprises heat exchange in a heat exchanger at a temperature whereby condensation is avoided, and wherein quenching step a2) comprises contact with a naphthalene-rich oil.

4. The process of claim 1, wherein quenching step a2) comprises direct contact with a naphthalene-rich oil at least in part from a bottom stream of the fractionation column of step a).

5. The process of claim 1, wherein the partial condensation in step b) is performed by quenching the gaseous effluent from step a) by contact with water.

6. The process of claim 1, wherein the partial condensation in step b) is performed by heat exchange in a heat exchanger.

7. The process of claim 1, wherein step c) of recovering BTX comprises an absorption step c1) of the gaseous effluent from step b) followed by a distillation or fractionation step c2) to separate a product comprising BTX and lean oil.

8. The process of claim 7, wherein absorption step c1) comprises contacting the gaseous effluent from step b) with a lean oil in an absorption column to result in a rich oil phase, and feed comprising the rich oil phase of step c1) is fractionated in step c2) to recover at least BTX and lean oil.

9. The process of claim 8, wherein the feed to fractionation step c2) further comprises the phenolic oil effluent from step a), and/or the liquid effluent containing hydrocarbons from step b).

10. The process of claim 9, wherein the lean oil used for absorption in step c1) comprises oil produced by biomass Bio-TCat, said oil comprising compounds present in Bio-TCat reactor effluent.

11. The process of claim 9, wherein the lean oil used for absorption in step c1) comprises oil not produced by biomass Bio-TCat.

12. The process of claim 11, wherein the lean oil used for absorption in step c1) comprises a diesel cut.

13. The process of claim 11, wherein the lean oil used for absorption in step c1) comprises an external stream of aromatics.

14. The process of claim 1, wherein the liquid effluent comprising water of step b) comprises less than 500 ppmw phenolic compounds.

15. The process of claim 1, wherein the liquid effluent comprising water of step b) comprises less than 300 ppmw phenolic compounds.

16. The process of claim 1, wherein the liquid effluent comprising water of step b) comprises 50 or less ppmw phenolic compounds.

17. The process of claim 1, wherein the liquid effluent comprising water of step b) comprises from 10 to 50 ppmw phenolic compounds.

\* \* \* \* \*